(12) United States Patent
Xu et al.

(10) Patent No.: US 9,374,719 B2
(45) Date of Patent: Jun. 21, 2016

(54) CHANNEL STATE INFORMATION REFERENCE SIGNAL (CSI-RS) HANDLING FOR NETWORK ASSISTED INTERFERENCE CANCELLATION

(71) Applicant: QUALCOMM Incorporated, San Diego, CA (US)

(72) Inventors: Hao Xu, San Diego, CA (US); Wanshi Chen, San Diego, CA (US); Tao Luo, San Diego, CA (US); Peter Gaal, San Diego, CA (US); Taesang Yoo, San Diego, CA (US); Yongbin Wei, San Diego, CA (US); Durga Prasad Malladi, San Diego, CA (US); Stefan Geirhofer, Brooklyn, NY (US)

(73) Assignee: QUALCOMM INCORPORATED, San Diego, CA (US)

( * ) Notice: Subject to any disclaimer, the term of this patent is extended or adjusted under 35 U.S.C. 154(b) by 80 days.

(21) Appl. No.: 14/243,848

(22) Filed: Apr. 2, 2014

(65) Prior Publication Data

US 2014/0301271 A1    Oct. 9, 2014

Related U.S. Application Data

(60) Provisional application No. 61/808,167, filed on Apr. 3, 2013.

(51) Int. Cl.
| | |
|---|---|
| *H04B 7/185* | (2006.01) |
| *H04W 4/00* | (2009.01) |
| *H04L 12/28* | (2006.01) |
| *H04W 24/02* | (2009.01) |
| *H04B 1/7103* | (2011.01) |

(Continued)

(52) U.S. Cl.
CPC ............. *H04W 24/02* (2013.01); *H04B 1/7103* (2013.01); *H04J 11/0059* (2013.01); *H04L 5/0092* (2013.01); *H04J 11/005* (2013.01); *H04L 5/005* (2013.01); *H04L 5/0007* (2013.01)

(58) Field of Classification Search
CPC ..... H04L 5/0007; H04L 5/005; H04L 5/0092; H04W 24/02; H04B 1/7107; H04B 7/0626; H04B 15/00; H04J 11/0023; H04J 11/005; H04J 11/0059
USPC .......... 370/310–350, 249, 252, 431, 437, 464
See application file for complete search history.

(56) References Cited

U.S. PATENT DOCUMENTS 8,537,911 B2 *  9/2013  Sayana ................. H04L 5/0048
                                                                341/173
8,576,822 B2 * 11/2013  Yoon ..................... H04L 5/0023
                                                                370/342

(Continued)

OTHER PUBLICATIONS

International Search Report and Written Opinion—PCT/US2014/032872—ISA/EPO—Oct. 13, 2014.

(Continued)

*Primary Examiner* — Tri H Phan
(74) *Attorney, Agent, or Firm* — Seyfarth Shaw LLP

(57) ABSTRACT

A method of wireless communication includes transmitting channel state information reference signal (CSI-RS) configuration information to a user equipment (UE). The CSI-RS configuration information is transmitted so that the UE may mitigate interference caused by interfering CSI-RSs. The CSI-RS configuration may be a CSI-RS configuration of a neighbor cell.

27 Claims, 12 Drawing Sheets

(51) Int. Cl.
*H04L 5/00* (2006.01)
*H04J 11/00* (2006.01)

(56) References Cited

U.S. PATENT DOCUMENTS

| | | | | |
|---|---|---|---|---|
| 8,730,897 B2* | 5/2014 | Kim | ....................... | H04B 7/024 370/329 |
| 8,755,365 B2* | 6/2014 | Lee | ................... | H04W 72/1273 370/208 |
| 8,837,452 B2* | 9/2014 | Yoon | ..................... | H04L 5/0023 370/342 |
| 8,897,182 B2* | 11/2014 | Yoon | ................. | H04W 72/0446 370/286 |
| 8,923,203 B2* | 12/2014 | Fong | ................... | H04J 11/0053 370/252 |
| 2010/0190447 A1 | 7/2010 | Agrawal et al. | | |
| 2010/0309861 A1 | 12/2010 | Gorokhov et al. | | |
| 2012/0176939 A1* | 7/2012 | Qu | ....................... | H04L 5/0023 370/255 |
| 2012/0287875 A1* | 11/2012 | Kim | ...................... | H04L 5/0048 370/329 |
| 2013/0196675 A1* | 8/2013 | Xiao | ................... | H04W 72/082 455/452.1 |
| 2013/0258886 A1* | 10/2013 | Chen | ..................... | H04B 7/0417 370/252 |
| 2014/0092760 A1* | 4/2014 | Geirhofer | ............. | H04W 24/10 370/252 |
| 2014/0126402 A1* | 5/2014 | Nam | ..................... | H04W 24/08 370/252 |
| 2014/0355711 A1* | 12/2014 | Yoon | .................... | H04L 5/0023 375/267 |

OTHER PUBLICATIONS

Partial International Search Report—PCT/US2014/032872—ISA/EPO—Jul. 25, 2014.
Xincheng Z., et al., "Reference Signal Design," In: LTE-Advanced Air Interface Technology, Sep. 5, 2012, CRC Press, XP055109683, ISBN: 978-1-46-650153-9, pp. 111-139, figure 3.36, p. 132-p. 133.

* cited by examiner

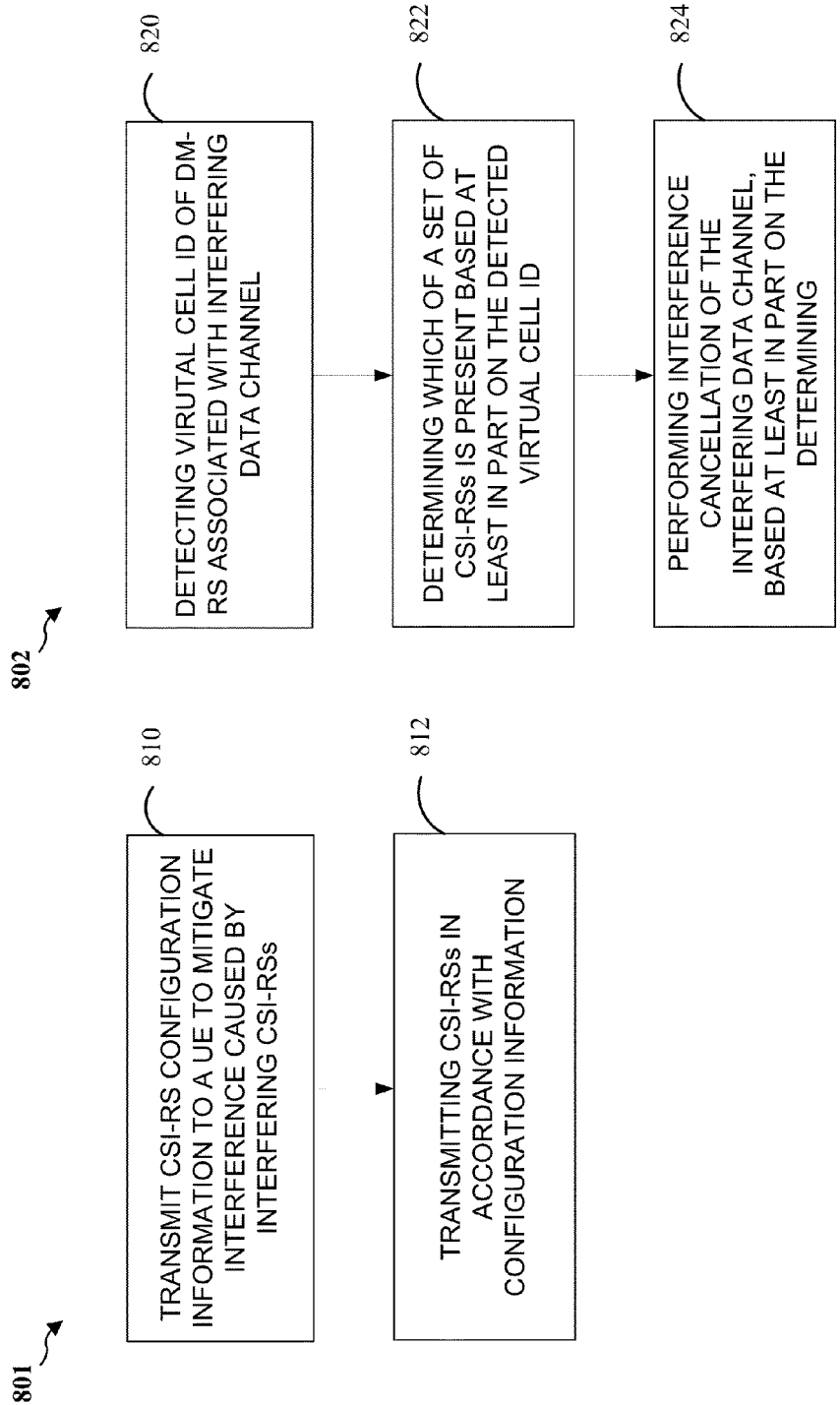

CHANNEL STATE INFORMATION REFERENCE SIGNAL (CSI-RS) HANDLING FOR NETWORK ASSISTED INTERFERENCE CANCELLATION

CROSS-REFERENCE TO RELATED APPLICATION

This application claims the benefit under 35 U.S.C. §119(e) to U.S. Provisional Patent Application No. 61/808,167 entitled "CHANNEL STATE INFORMATION REFERENCE SIGNAL (CSI-RS) HANDLING FOR NETWORK ASSISTED INTERFERENCE CANCELLATION," filed on Apr. 3, 2013, the disclosure of which is expressly incorporated by reference herein in its entirety.

BACKGROUND

1. Field

Aspects of the present disclosure relate generally to wireless communication systems, and more particularly to interference cancellation and mitigation.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

SUMMARY

In one aspect of the present disclosure, a method of wireless communication is disclosed. The method includes transmitting CSI-RS configuration information to a UE to mitigate interference caused by interfering CSI-RSs.

In another aspect of the present disclosure, a method of wireless communication is disclosed. The method includes detecting a virtual cell ID of a demodulation reference signal (DM-RS) associated with an interfering data channel. The method also includes determining which of a set of CSI-RSs is present based on the detected virtual cell ID. The method further includes performing interference cancellation of the interfering data channel, based on the determining.

In yet another aspect of the present disclosure, a method of wireless communication is disclosed. The method includes receiving, at a UE, CSI-RS configuration information to mitigate interference caused by interfering CSI-RSs.

In still yet another aspect of the present disclosure, a wireless communication having a memory and at least one processor coupled to the memory is disclosed. The processor(s) is configured to receive CSI-RS configuration information to mitigate interference caused by interfering CSI-RSs.

In another aspect of the present disclosure, an apparatus for wireless communication is disclosed. The apparatus includes means for receiving CSI-RS configuration information to mitigate interference caused by interfering CSI-RS. The apparatus also includes means for mitigating the interference based at least in part on the received CSI-RS configuration information.

In yet another aspect of the present disclosure, an apparatus for wireless communication is disclosed. The apparatus includes means for determining the CSI-RS configuration information for a neighbor cell and/or a serving cell. The apparatus also includes means for transmitting CSI-RS configuration information to a UE to mitigate interference caused by interfering CSI-RSs.

Still another aspect of the present disclosure is directed to apparatus for wireless communication. The apparatus includes means for detecting a virtual cell ID of a DM-RS associated with an interfering data channel. The apparatus also includes means for determining which of a set of CSI-RSs is present based on the detected virtual cell ID. The apparatus still further includes means for performing interference cancellation of the interfering data channel, based on the determined set of CSI-RS that are present.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIGS. 8A-8C are block diagrams illustrating methods for handling CSI-RS according to an aspect of the present disclosure.

DETAILED DESCRIPTION

Figure 1:
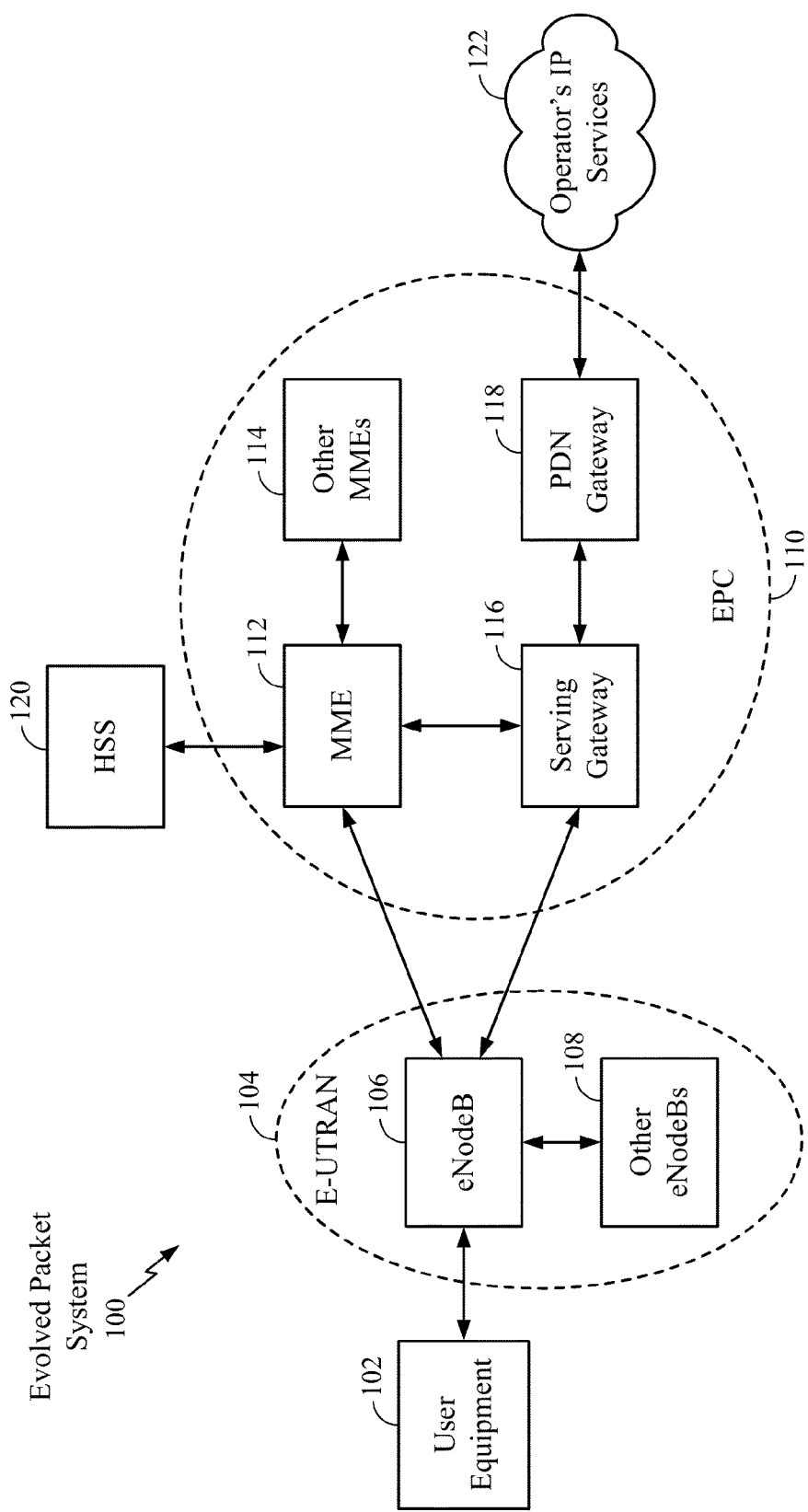
FIG. 1 is a diagram illustrating an example of a network architecture.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects of the telecommunication systems are presented with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a non-transitory computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNodeB) 106 and other eNodeBs 108. The eNodeB 106 provides user and control plane protocol terminations toward the UE 102. The eNodeB 106 may be connected to the other eNodeBs 108 via a backhaul (e.g., an X2 interface). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected to the EPC 110 via, e.g., an S1 interface. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
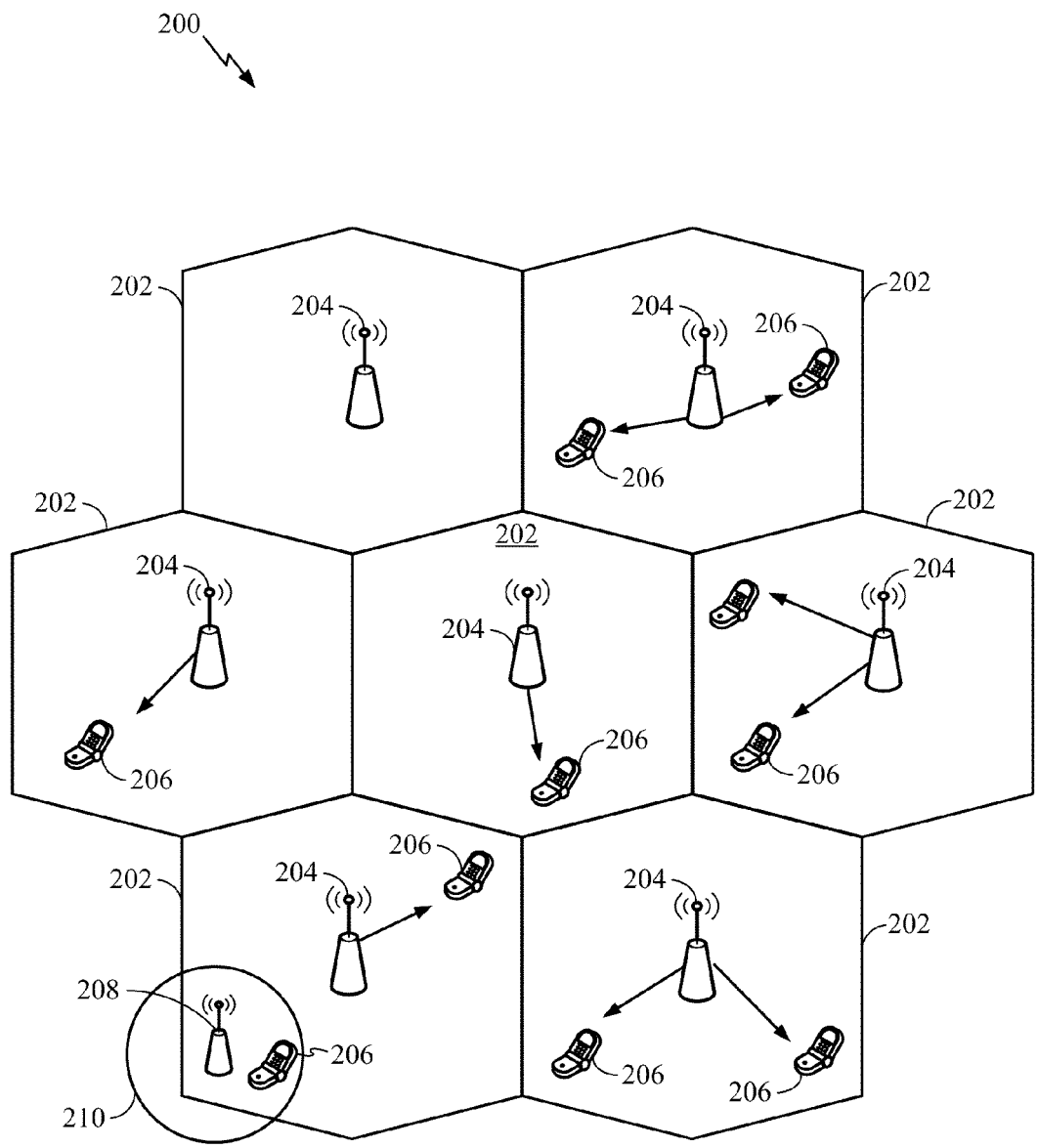
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNodeBs 208 may have cellular regions 210 that overlap with one or more of the cells 202. A lower power class eNodeB 208 may be a remote radio head (RRH), a femto cell (e.g., home eNodeB (HeNB)), a pico cell, or a micro cell. The macro eNodeBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the downlink and SC-FDMA is used on the uplink to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 206 with different spatial signatures, which enables each of the UE(s) 206 to recover the one or more data streams destined for that UE 206. On the uplink, each UE 206 transmits a spatially precoded data stream, which enables the eNodeB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 3:
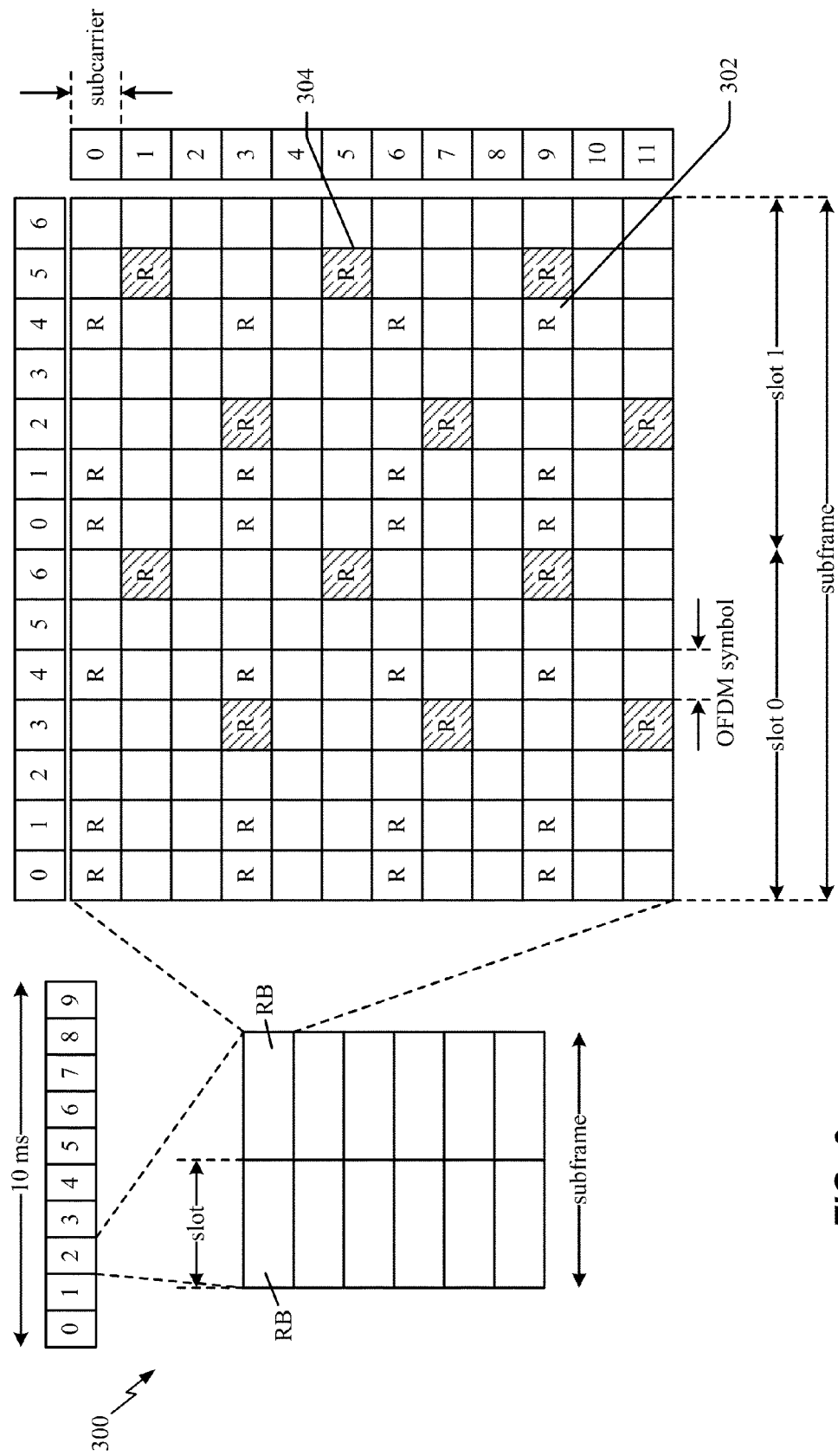
FIG. 3 is a diagram illustrating an example of a downlink frame structure in LTE.

FIG. 3 is a diagram 300 illustrating an example of a downlink frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include downlink reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 4:
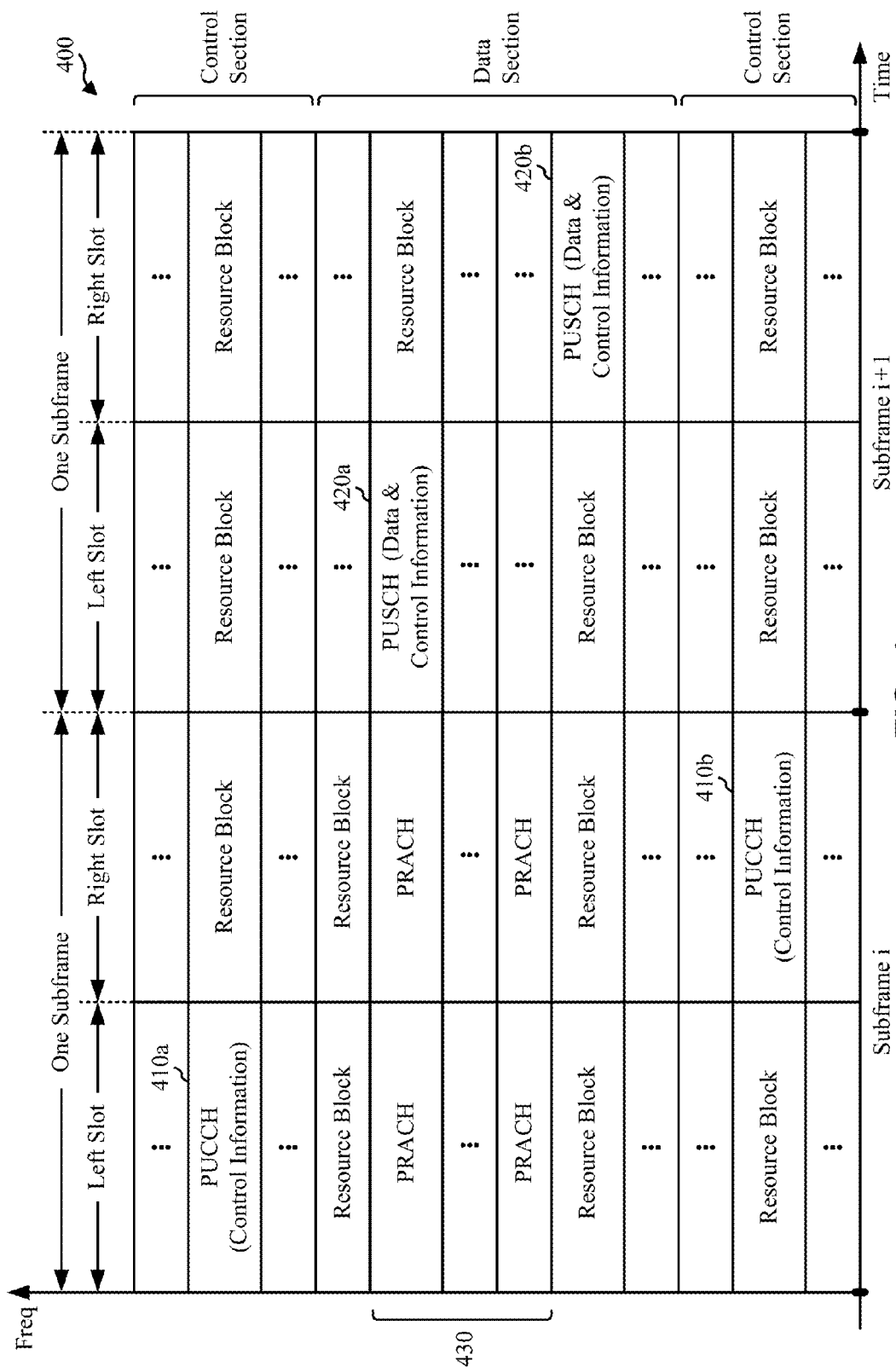
FIG. 4 is a diagram illustrating an example of an uplink frame structure in LTE.

FIG. 4 is a diagram 400 illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 410a, 410b in the control section to transmit control information to an eNodeB.

The UE may also be assigned resource blocks 420a, 420b in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An uplink transmission may span both slots of a subframe and may hop across frequency.

A set of resource blocks may be used to perform initial system access and achieve uplink synchronization in a physical random access channel (PRACH) 430. The PRACH 430 carries a random sequence. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
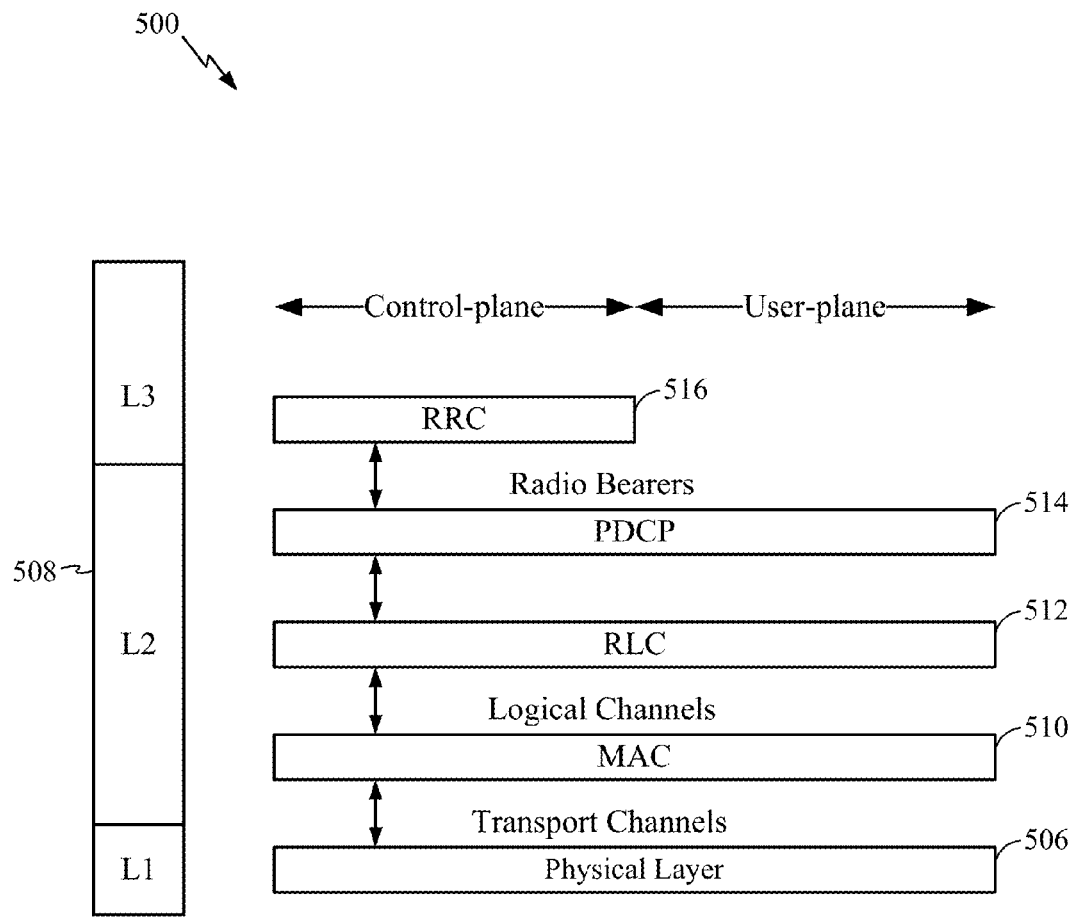
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNodeB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNodeB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNodeB and the UE.

Figure 6:
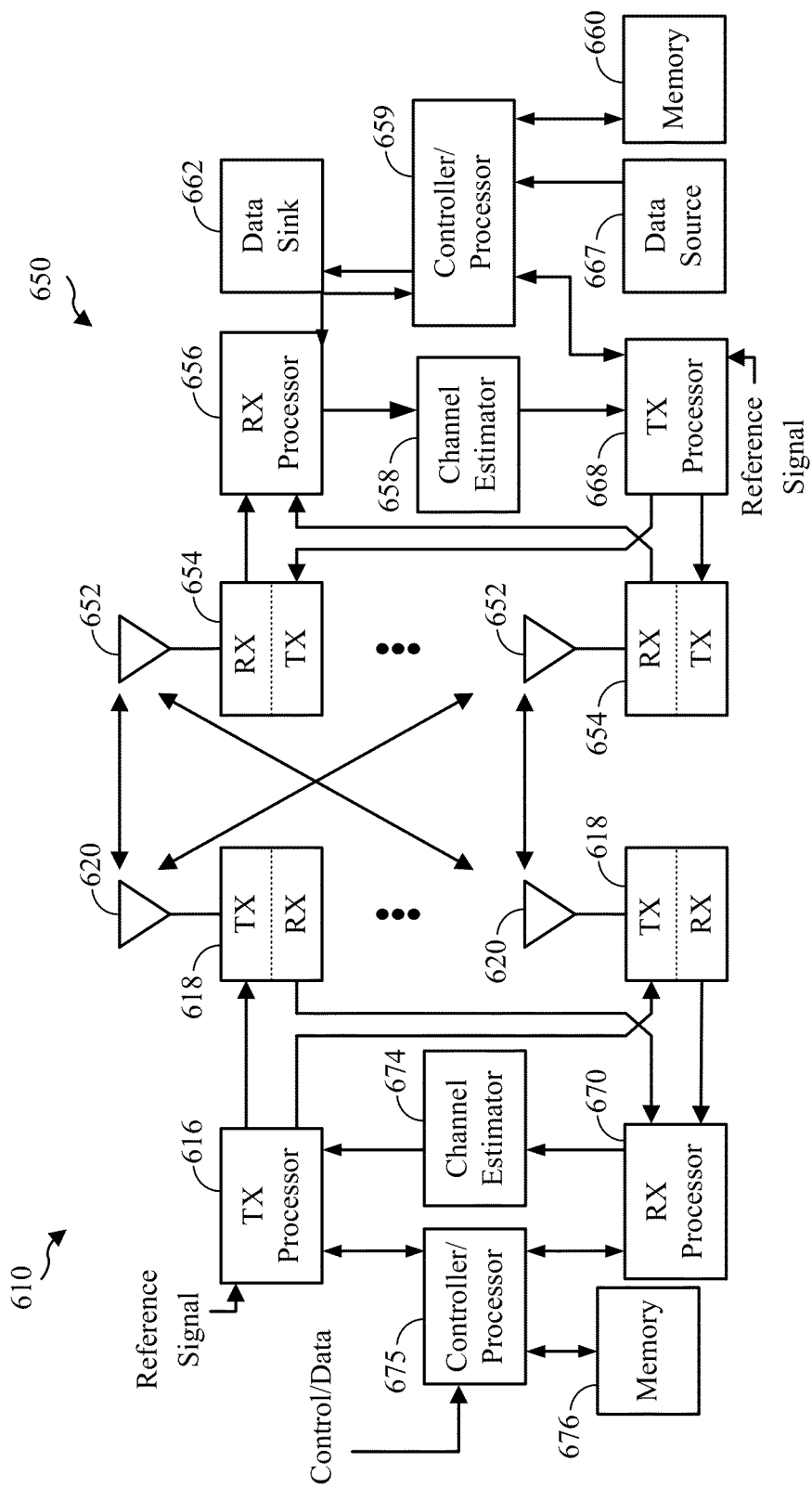
FIG. 6 is a diagram illustrating an example of an evolved Node B and user equipment in an access network.

FIG. 6 is a block diagram of an eNodeB 610 in communication with a UE 650 in an access network. In the downlink, upper layer packets from the core network are provided to a controller/processor 675. The controller/processor 675 implements the functionality of the L2 layer. In the downlink, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 658. The soft decisions are then decoded and deinterleaved to recover the data and control signals that were originally transmitted by the eNodeB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the uplink, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the uplink, a data source 667 is used to provide upper layer packets to the controller/processor 659. The data source 667 represents all protocol layers above the L2 layer. Similar to the functionality described in connection with the downlink transmission by the eNodeB 610, the controller/processor 659 implements the L2 layer for the user plane and the control plane by providing header compression, ciphering, packet segmentation and reordering, and multiplexing between logical and transport channels based on radio resource allocations by the eNodeB 610. The controller/processor 659 is also responsible for HARQ operations, retransmission of lost packets, and signaling to the eNodeB 610.

Channel estimates derived by a channel estimator 658 from a reference signal or feedback transmitted by the eNodeB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The uplink transmission is processed at the eNodeB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the uplink, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Various frameworks for channel state information (CSI) feedback may be specified to support downlink coordinated multi-point (CoMP) operations. The feedback frameworks may be based on non-zero power (NZP) and/or zero-power (ZP) channel state information reference signal (CSI-RS) resources. For example, channel measurements may be performed based on non-zero power CSI-RS resources. Additionally, interference measurements may be performed based on zero-power resources and/or non-zero power CSI-RS resources.

In some cases, channel measurement resources and/or interference measurement resources may be specified to enable CSI feedback for different feedback frameworks and/or interference hypotheses. That is, multiple channel measurement resources may be used to provide CSI feedback for different serving assumptions. In one configuration, multiple channel measurement resources are specified for dynamic point selection (DPS) so that the CSI is reported for channel conditions from two separate transmission points. The channel measurement resources may also be specified for other types of coordinated multi-point operations.

As previously discussed, the interference measurement resources may include zero power CSI-RS resources and/or non-zero power CSI-RS resources. A UE may be configured to measure interference on an interference measurement resource to provide CSI feedback under different interference assumptions. Specifically, for each interference measurement resource, the UE may measure interference on the resources that include the interference measurement resources.

In LTE Release 11, an enhanced control channel, such as the enhanced PDCCH (EPDCCH), is introduced. In contrast to a conventional control channel that occupies the first several control symbols in a subframe, the enhanced control channel may occupy the data region of a subframe, similar to the shared channel (i.e., PDSCH). The enhanced control channel may increase control channel capacity, support frequency-domain inter-cell interference coordination (ICIC), improve spatial reuse of control channel resources, support beamforming and/or diversity, operate on the new carrier type, operate in multimedia broadcast over single frequency network (MBSFN) subframes, and/or coexist on the same carrier as conventional user equipments (UEs).

In LTE Release 8/9/10, each UE monitors a set of downlink control channel decoding candidates. Generally, there are two sets of downlink control channel decoding candidates: common search space (CSS) and UE-specific search space. The common search space includes up to six decoding candidates, such as four candidates for aggregation level four and two candidates for aggregation level eight. An aggregation level N is defined as N control channel elements (CCE). Each control channel element includes thirty-six resource elements (REs). The common search spaces are common to all UEs and are primarily used to broadcast information, such as system information, paging information, and/or a random access channel (RACH) response. The common search space may also be used for unicast scheduling. For each decoding candidate, a maximum of two distinct downlink control information (DCI) format sizes may be specified. Thus, there may be twelve blind decodes in a system.

Figure 7:
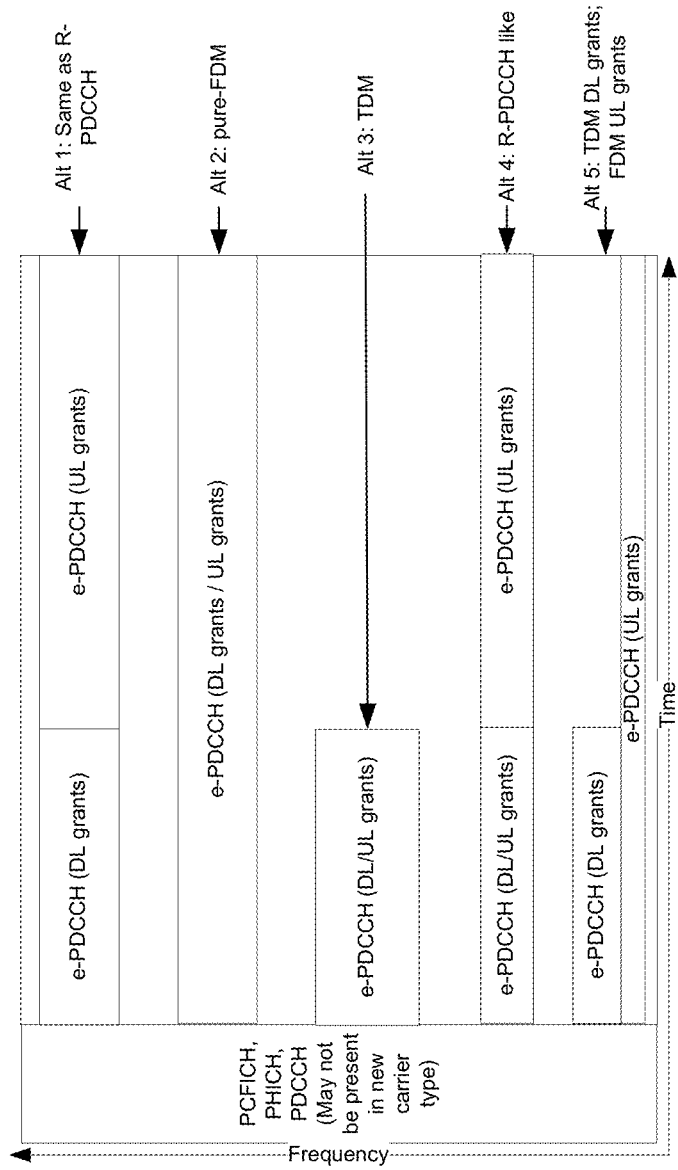
FIG. 7 is a block diagram illustrating various EPDCCH structures.

FIG. 7 illustrates an example of various enhanced control channel structures. In one configuration, the enhanced control channel structure may be the same as the relay physical downlink control channel (R-PDCCH) structure. In another configuration, the enhanced control channel may be frequency division multiplexed (FDM), such as pure-FDM. In yet another configuration, the enhanced control channel structure is time division multiplexed. In still yet another configuration, the enhanced control channel is similar to, but not the same as the relay physical downlink control channel (R-PDCCH). In still another configuration, the enhanced control channel may be a combination of time division multiplexed and frequency division multiplexed.

One aspect of the present disclosure is directed to providing signaling to a UE to facilitate an interfering signal/interference cancellation (IS/IC) operation for a shared downlink channel and/or an enhanced control channel. In one configuration, the signaling is provided when the cell ID associated with an interfering channel is associated with a virtual cell ID(s).

The physical cell ID may be detected from a primary synchronization signal (PSS) and/or a secondary synchronization signal (SSS) and is fixed for each cell. In contrast, the virtual cell ID may change for each cell. A channel with a physical cell ID has an increased likelihood of being detected via blind decoding in comparison to a channel with the virtual cell ID. Therefore, it may be desirable to provided signaling when the cell ID associated with an interfering channel is associated with a virtual cell ID(s).

In one configuration, the interfering channel may be from the same cell or different cell, and/or the same or different UEs. The CSI-RS of the interfering channel may be used to mitigate inference caused by the interfering channel. That is, the UE may use the CSI-RS configuration of one or more neighbor cells to mitigate interference caused by the CSI-RS of the one or more neighbor cells.

Various signaling options for handling CSI-RS may be specified. In one configuration, a superset of CSI-RS configurations from neighbor cells is signaled to a UE. That is, the CSI-RS configurations of different users of a neighbor cell and/or a superset of CSI-RS configurations of multiple neighbor cells are signaled to the UE. The superset may be signaled in terms of subframe, virtual cell ID (VCID), and/or the maximum number of CSI-RS processes within each subset. Additionally, when a subframe shift is used in heterogeneous networks (HetNets) between the macro layer and the pico layer, the subframe shift ("n_s") may also be signaled so the UE can infer the correct CSI-RS scrambling sequence. Furthermore, in one configuration, a superset of CSI-RS configurations that includes both zero power (ZP) and non-zero power (NZP) CSI-RSs may be signaled to a UE. Alternately, in another configuration, only the zero power CSI-RS configurations are signaled and blind detection is used to detect the non-zero power CSI-RS configurations.

In another configuration, the neighbor cell CSI-RS subframe configuration is signaled to the UE. That is, only the CSI-RS configuration for specific CSI-RS subframes are transmitted to the UE. In this configuration, the UE may skip the interference cancellation/interference management (IC/IM) processing for CSI-RS subframes based on the received CSI-RS subframe configuration. That is, to improve performance and/or avoid blind detection for a large number of CSI-RS configurations, the UE may bypass (i.e., skip) interference cancellation whenever there is a CSI-RS in a subframe, e.g. to reduce power consumption.

Furthermore, in yet another configuration, the UE performs CSI-RS blind decoding within the CSI-RS subframes. Furthermore, the network may configure each zero power CSI-RS such that each zero power CSI-RS covers a fixed set of resource elements (REs). Additionally, the network configured zero power CSI-RS may also cover non-zero power CSI-RS. That is, non-zero power CSI-RS and zero power CSI-RS may be mapped to the same resources. Thus, downlink shared channel cancellation may be facilitated because rate matching of the interfering downlink shared channel does not dynamically change.

In yet another configuration, the CSI-RS configuration indices or a set of REs that could be used for CSI-RS are limited. In this configuration, messaging between eNodeBs may be used to exchange information. Radio resource control (RRC) signaling may be specified to inform a UE with advanced receiver capability of the CSI-RS configuration set.

Instead of using all possible CSI-RS configurations, various network restrictions may be implemented to reduce signaling. In one configuration, the mapping of the CSI-RS virtual cell ID may be restricted to be the same as the physical cell ID (PCI). Specifically, the physical cell ID may be more detectable by the UE. Therefore, mapping the CSI-RS virtual cell ID to the physical cell ID may improve the detection of the CSI-RS configurations. Additionally, the same subframes may be used for all neighbor cell CSI-RSs. For these subframes, the UE does not perform code word level interference cancellation. Further, in another configuration, the union of the zero power and non-zero power CSI-RS across neighbor cells is the same within a subframe. In another configuration, the CSI-RS are restricted to a specific (i.e., limited) set of virtual cell IDs from all possible virtual cell IDs. In still yet another configuration, the UE may be signaled the CSI-RS subframes of a neighbor cell(s).

In another aspect of the present disclosure, the demodulation reference signal (DM-RS) is linked with the CSI-RS. That is, the DM-RS may be linked to the CSI-RS based on a virtual cell ID. It may be desirable to link the configurations of DM-RS and CSI-RS in such a way that if the UE detects DM-RS, then the UE is also aware of the CSI-RS configuration. In another configuration, the DM-RS and CSI-RS use the same virtual cell ID.

The demodulation reference signal may be more detectable in comparison to the CSI-RS. The DM-RS is present in known resource element locations and the CSI-RS may be determined once the DM-RS is detected. In particular, in a given subframe, the UE determines the DM-RS virtual cell ID used by an interfering downlink shared channel that is to be cancelled. Based on the detected DM-RS virtual cell ID, the UE determines a set of zero power CSI-RS to be used in a particular subframe. The network may dynamically signal the zero power CSI-RS set via bits present in downlink control information (DCI) format 2D. The UE performs interference cancellation of the interfering downlink shared channel based on the associated determined zero power CSI-RS set. Those skilled in the art will understand that a similar procedure may be implemented for non-zero power CSI-RS related parameters.

Paging information can also be determined to help decide when to drop CSI-RS. In one configuration, the UE is informed of the CSI-RS configuration and also the paging information of neighbor cells. In particular, paging related information may be transmitted as part of the signaling of CSI-RS related parameters. The CSI-RS transmissions may be dropped due to conflicts with paging occurrences. In another configuration, the UE is informed of the paging related parameters of a non-serving cell, such as a neighbor cell, so that the UE can infer when the CSI-RS of the non-serving cell are dropped.

An eNodeB may modify the signaling of information, such as paging information, based on a type of receiver and/or the receiver's capabilities. That is, additional options may be available for various types of advanced receivers. In one configuration, the UE is configured to signal its receiver type/capability to an eNodeB. The network can operate accordingly. For example, for a minimum mean square error and interference rejection combiner (MMSE-IRC) type advanced receiver signaling of CSI-RS configurations may not be needed. For a maximum likelihood (ML) and a symbol level interference cancellation (IC) receiver, CSI-RS tones are avoided for blind estimation. Accordingly, the presence of CSI-RS may be blindly decoded or the CSI-RS locations may be signaled. For a code word level interference cancellation receiver, explicit information of the CSI-RS for rate matching may be signaled.

Figure 8C:
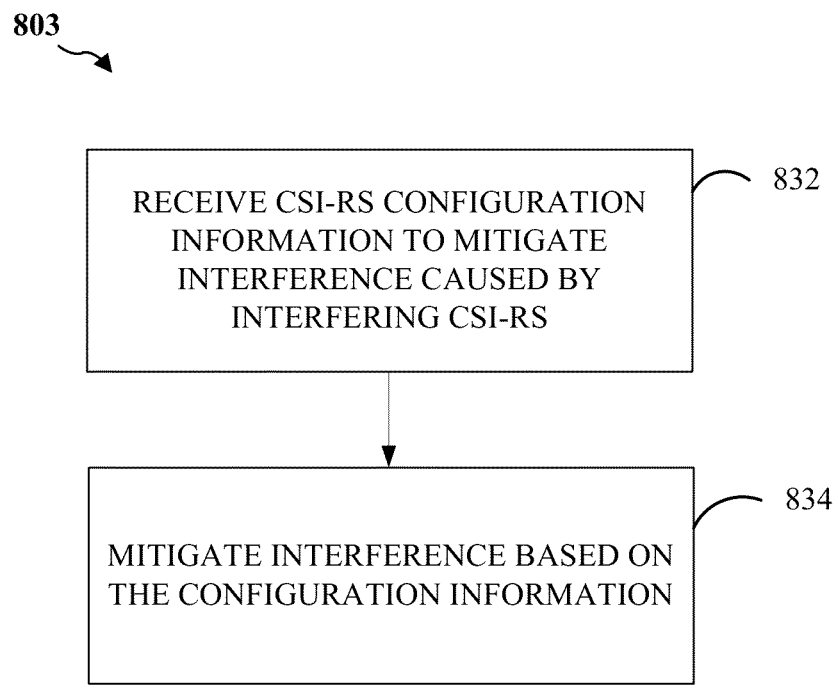

FIGS. 8A-8C illustrate methods for handling CSI-RS. In particular, FIG. 8A illustrates a method 801 for transmitting CSI-RS configurations according to an aspect of the present disclosure. As shown in FIG. 8A, the eNodeB transmits CSI-RS configuration information to a UE to mitigate interference caused by interfering CSI-RSs, in block 810. The CSI-RS configuration information may be the CSI-RS configuration information of a neighbor cell. In block 812, the eNodeB transmits CSI-RS in accordance with the configuration information.

In one configuration, the eNodeB 610 is configured for wireless communication including means for transmitting. In one aspect, the transmitting means may be the controller/processor 675, memory 676, transmit processor 616, modulators 618 and/or antenna 620 configured to perform the functions recited by the transmitting means. In another aspect, the aforementioned means may be any module or any apparatus configured to perform the functions recited by the aforementioned means.

FIG. 8B illustrates a method 802 for detecting a virtual cell ID according to an aspect of the present disclosure. As shown in FIG. 8B, a UE detects a virtual cell ID of a demodulation reference signal (DM-RS) associated with an interfering data channel, in block 820. The UE determines which of a set of channel state information reference signals (CSI-RSs) is present based at least in part on the detected virtual cell ID, in block 822. Next, in block 824, interference cancellation is performed, on the interfering data channel, based at least in part on the determining.

In one configuration, the UE 650 is configured for wireless communication including means for detecting. In one aspect, the detecting means may be the controller processor 659 and/or memory 660 configured to perform the functions recited by the detecting means. The UE is also configured to include means for determining. In one aspect, the determining means may be the controller/processor 659 and/or memory 660 configured to perform the functions recited by the determining means. The UE is also configured to include means for perform interference cancellation. In one aspect, the performing means may be the controller/processor 659 and/or memory 660 configured to perform the functions recited by the performing means. In another aspect, the aforementioned means may be any module or any apparatus configured to perform the functions recited by the aforementioned means.

FIG. 8C illustrates a method 803 for receiving a CSI-RS configuration according to another aspect of the present disclosure. As shown in FIG. 8C, the UE receives CSI-RS configuration information to mitigate interference caused by interfering CSI-RSs, in block 832. The CSI-RS configuration information may be the CSI-RS configuration information of a neighbor cell. In block 834, the UE mitigates interference based on the configuration information.

In one configuration, the UE 650 is configured for wireless communication including means for receiving. In one aspect, the receiving means may be the controller processor 659, memory 660, receive processor 656, modulators 654, and/or antenna 652 configured to perform the functions recited by the receiving means. The UE is also configured to include means for mitigating. In one aspect, the mitigating means may be the controller/processor 659 and/or memory 660 configured to perform the functions recited by the mitigating means. In another aspect, the aforementioned means may be any module or any apparatus configured to perform the functions recited by the aforementioned means.

Figure 9:
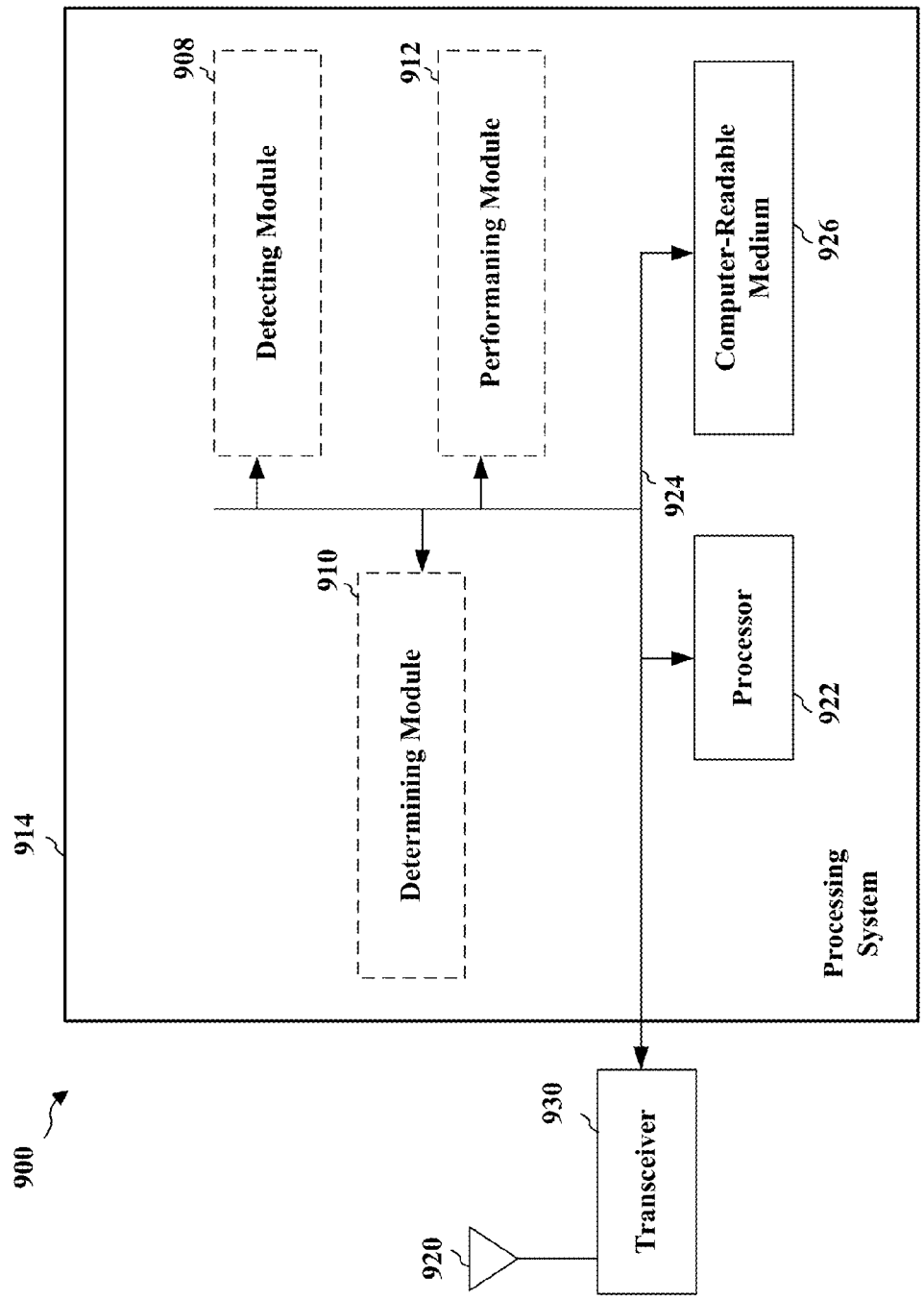
FIGS. 9-11 is a block diagram illustrating different modules/means/components in an exemplary apparatus.

FIG. 9 is a diagram illustrating an example of a hardware implementation for an apparatus 900 employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware modules, represented by the processor 922, the modules 908, 910, 912 and the computer-readable medium 926. The bus 924 may also link various other circuits such as timing sources, peripherals, voltage regulators, and power management circuits, which are well known in the art, and therefore, will not be described any further.

The apparatus includes a processing system 914 coupled to a transceiver 930. The transceiver 930 is coupled to one or more antennas 920. The transceiver 930 enables communicating with various other apparatus over a transmission medium. The processing system 914 includes a processor 922 coupled to a computer-readable medium 926. The processor 922 is responsible for general processing, including the execution of software stored on the computer-readable medium 926. The software, when executed by the processor 922, causes the processing system 914 to perform the various functions described for any particular apparatus. The computer-readable medium 926 may also be used for storing data that is manipulated by the processor 922 when executing software.

The processing system 914 includes a detecting module 908 for detecting a virtual cell ID of a DM-RS associated with an interfering data channel. The processing system 914 also includes a determining module 910 for determining which of a set of CSI-RSs is present based at least in part on the detected virtual cell ID. The processing system 914 may further include a performing module 912 for performing interference cancellation. The modules may be software modules running in the processor 922, resident/stored in the computer-readable medium 926, one or more hardware modules coupled to the processor 922, or some combination thereof. The processing system 914 may be a component of the UE 650 and may include the memory 660, and/or the controller/processor 659.

Figure 10:
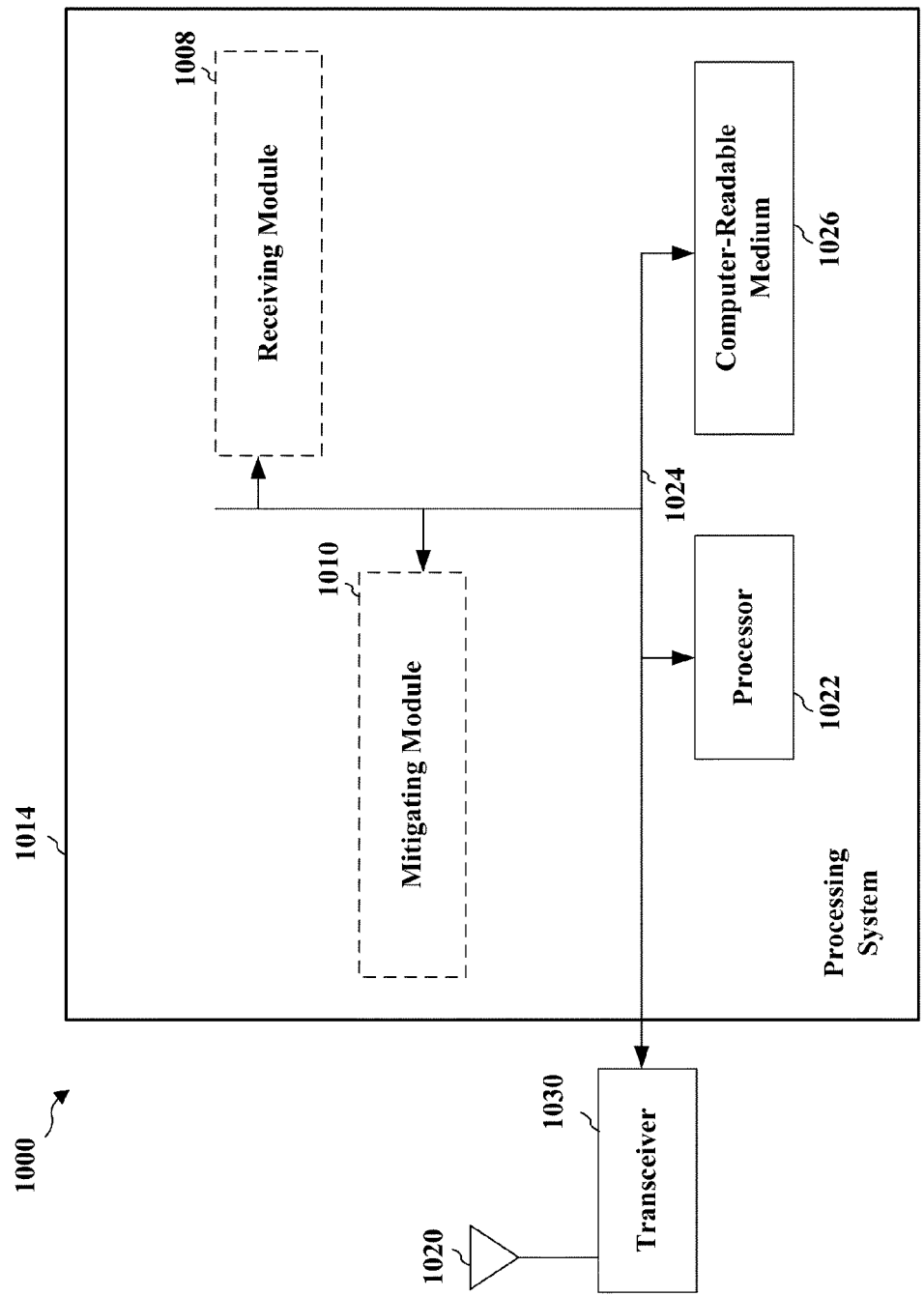

FIG. 10 is a diagram illustrating an example of a hardware implementation for an apparatus 1000 employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware modules, represented by the processor 1022, the modules 1008, 1010 and the computer-readable medium 1026. The bus 1024 may also link various other circuits such as timing sources, peripherals, voltage regulators, and power management circuits, which are well known in the art, and therefore, will not be described any further.

The apparatus includes a processing system 1014 coupled to a transceiver 1030. The transceiver 1030 is coupled to one or more antennas 1020. The transceiver 1030 enables communicating with various other apparatus over a transmission medium. The processing system 1014 includes a processor 1022 coupled to a computer-readable medium 1026. The processor 1022 is responsible for general processing, including the execution of software stored on the computer-readable medium 1026. The software, when executed by the processor 1022, causes the processing system 1014 to perform the various functions described for any particular apparatus. The computer-readable medium 1026 may also be used for storing data that is manipulated by the processor 1022 when executing software.

The processing system 1014 includes a receiving module 1008 for receiving the CSI-RS configuration information to mitigate interference caused by interfering CSI-RSs. The CSI-RS configuration information may be the CSI-RS configuration information of a neighbor cell. The processing system 1014 also includes a mitigating module 1010 for mitigating interference based on the configuration information. The modules may be software modules running in the processor 1022, resident/stored in the computer-readable medium 1026, one or more hardware modules coupled to the processor 1022, or some combination thereof. The processing system 1014 may be a component of the UE 650 and may include the memory 660, and/or the controller/processor 659.

Figure 11:
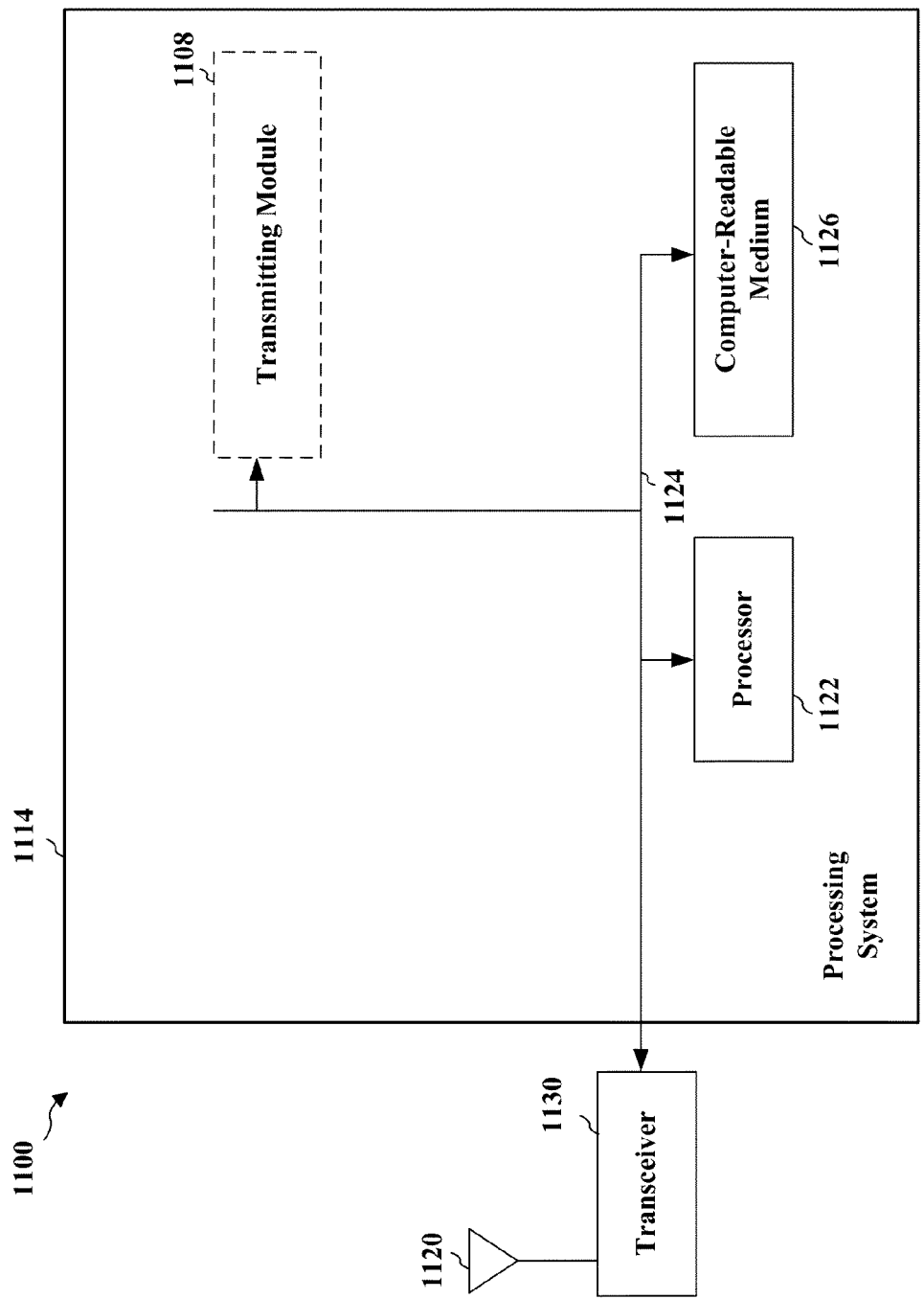

FIG. 11 is a diagram illustrating an example of a hardware implementation for an apparatus 1100 employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1122, the module 1108 and the computer-readable medium 1126. The bus 1124 may also link various other circuits such as timing sources, peripherals, voltage regulators, and power management circuits, which are well known in the art, and therefore, will not be described any further.

The apparatus includes a processing system 1114 coupled to a transceiver 1130. The transceiver 1130 is coupled to one or more antennas 1120. The transceiver 1130 enables communicating with various other apparatus over a transmission medium. The processing system 1114 includes a processor 1122 coupled to a computer-readable medium 1126. The processor 1122 is responsible for general processing, including the execution of software stored on the computer-readable medium 1126. The software, when executed by the processor 1122, causes the processing system 1114 to perform the various functions described for any particular apparatus. The computer-readable medium 1126 may also be used for storing data that is manipulated by the processor 1122 when executing software.

The processing system 1114 includes a transmitting module 1108 for transmitting CSI-RS configuration information to a UE to mitigate interference caused by interfering CSI-RSs. The CSI-RS configuration information may be the CSI-RS configuration information of a neighbor cell. The transmitting module 1108 may also be configured to transmit CSI-RS in accordance with the configuration information. The modules may be software modules running in the processor 1122, resident/stored in the computer-readable medium 1126, one or more hardware modules coupled to the processor 1122, or some combination thereof. The processing system 1114 may be a component of the eNodeB 610 and may include the memory 676, and/or the controller/processor 675.

In one configuration, the eNodeB 610 is configured for wireless communication including means for determining. In one aspect of the present disclosure, the determining means may be the controller/processor 675, processor 1122 and/or memory 646 configured to perform the functions recited by the determining means. The eNodeB 610 is also configured to include a means for transmitting. In one configuration, the transmitting means may be the transmit processor 616, modulators 618, antenna 620, transmitting module 1108, transceiver 1130, and/or antennas 1120 configured to perform the functions recited by the transmitting means. In another configuration, the aforementioned means may be any module or any apparatus configured to perform the functions recited by the aforementioned means.

In one configuration, the UE 650 is configured for wireless communication including means for receiving. In one aspect of the present disclosure, the receiving means may be the controller/processor 659, memory 660, receive processor 656, modulators 654, antenna 652, receiving module 1009, transceiver 1030, and/or antennas 1020 configured to perform the functions recited by the receiving means. The UE 650 may also be configured for wireless communication including means for mitigating the interference. In one configuration, the mitigating means may be the controller/processor 659, memory 660, receive processor 656, processor 1022, and/or mitigating module 1010 configured to perform the functions recited by the mitigating means.

In another configuration, the UE 650 is configured for wireless communication including means for detecting. In one aspect of the present disclosure, the receiving means may be the controller/processor 659, memory 660, receive processor 656, modulators 654, and/or detecting module 908 configured to perform the functions recited by the receiving means. The UE 650 may also be configured for wireless communication including means for determining. In one configuration, the determining means may be the controller/processor 659, memory 660, receive processor 656, processor 1022, and/or determining module 910 configured to perform the functions recited by the mitigating means. The UE 650 may also be configured for wireless communication including means for performing. In one configuration, the performing means may be the controller/processor 659, memory 660, receive processor 656, processor 1022, and/or performing module 912 configured to perform the functions recited by the mitigating means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   transmitting channel state information reference signal (CSI-RS) configuration information to a user equipment (UE), the CSI-RS configuration information intended for the UE to mitigate interference caused by interfering CSI-RSs transmitted on a channel associated with a virtual cell ID.

2. The method of claim 1, in which the CSI-RS configuration information comprises a set of all CSI-RS configurations of different users of a neighbor cell or a set of all CSI-RS configurations of a plurality of neighbor cells.

3. The method of claim 1, in which the CSI-RS configuration information comprises a neighbor cell CSI-RS configuration.

4. The method of claim 1, further comprising receiving, from a neighbor cell, a limited set of resource elements for CSI-RSs of the neighbor cell.

5. The method of claim 1, further comprising restricting a CSI-RS virtual cell ID to a physical cell ID (PCI) or a limited set of virtual cell IDs.

6. The method of claim 1, in which the CSI-RS configuration information comprises CSI-RS subframes of a neighbor cell.

7. The method of claim 1, further comprising limiting zero power and non-zero power CSI-RSs to same locations of zero power and non-zero power CSI-RSs of a neighbor cell.

8. The method of claim 1, further comprising transmitting paging information of a neighbor cell.

9. The method of claim 1, in which the transmitting is based at least in part on a receiver type of the UE.

10. A method of wireless communication, comprising:
    receiving, at a user equipment (UE), channel state information reference signal (CSI-RS) configuration information to mitigate interference caused by interfering CSI-RSs transmitted on a channel associated with a virtual cell ID; and
    performing interference cancellation based on the CSI-RS configuration information.

11. The method of claim 10, in which the CSI-RS configuration information comprises a set of all CSI-RS configurations of different users of a neighbor cell or a set of all CSI-RS configurations of a plurality of neighbor cells.

12. The method of claim 10, in which the CSI-RS configuration information comprises a neighbor cell CSI-RS configuration.

13. The method of claim 10, in which a serving cell receives a limited set of resource elements for CSI-RSs of a neighbor cell.

14. The method of claim 10, in which a CSI-RS virtual cell ID is restricted to a physical cell ID (PCI) or a limited set of virtual cell IDs.

15. The method of claim 10, in which the CSI-RS configuration information comprises CSI-RS subframes of a neighbor cell.

16. The method of claim 10, in which zero power and non-zero power CSI-RSs are limited to same locations of zero power and non-zero power CSI-RSs of a neighbor cell.

17. The method of claim 10, further comprising receiving paging information of a neighbor cell.

18. The method of claim 10, in which the receiving is based at least in part on a receiver type of the UE.

19. A user equipment (UE), comprising:
    a memory unit; and
    at least one processor coupled to the memory unit, the at least one processor being configured:
    to receive channel state information reference signal (CSI-RS) configuration information to mitigate interference caused by interfering CSI-RSs transmitted on a channel associated with a virtual cell ID; and
    to perform interference cancellation based on the CSI-RS configuration information.

20. The UE of claim 19, in which the CSI-RS configuration information comprises a set of all CSI-RS configurations of different users of a neighbor cell or a set of all CSI-RS configurations of a plurality of neighbor cells.

21. The UE of claim 19, in which the CSI-RS configuration information comprises a neighbor cell CSI-RS configuration.

22. The UE of claim 19, in which a serving cell receives a limited set of resource elements for CSI-RSs of a neighbor cell.

23. The UE of claim 19, in which a CSI-RS virtual cell ID is restricted to a physical cell ID (PCI) or a limited set of virtual cell IDs.

24. The UE of claim 19, in which the CSI-RS configuration information comprises CSI-RS subframes of a neighbor cell.

25. The UE of claim 19, in which zero power and non-zero power CSI-RSs are limited to same locations of zero power and non-zero power CSI-RSs of a neighbor cell.

26. The UE of claim 19, in which the at least one processor is further configured to receive paging information of a neighbor cell.

27. The UE of claim 19, in which the receiving is based at least in part on a receiver type of the UE.

* * * * *